No. 699,729. Patented May 13, 1902.
B. H. WEISKER.
SYSTEM OF SUBMARINE CONSTRUCTION.
(Application filed Jan. 6, 1900. Renewed Oct. 7, 1901.)
(No Model.) 5 Sheets—Sheet 1.
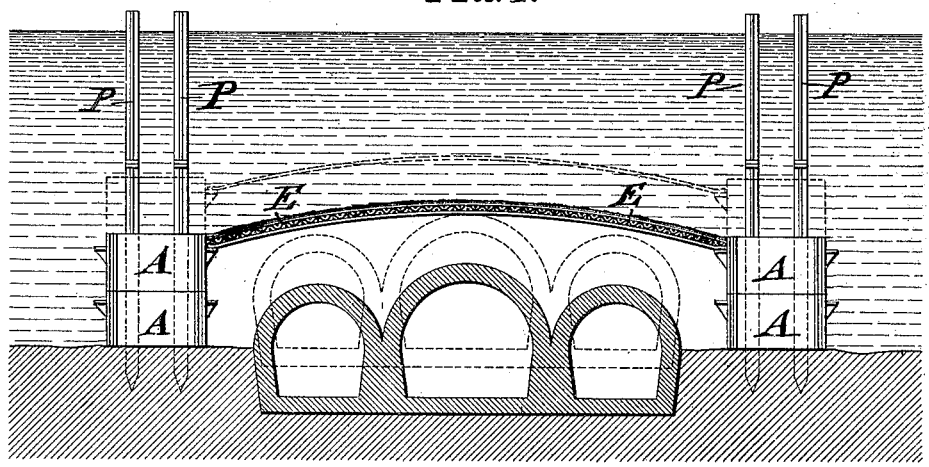
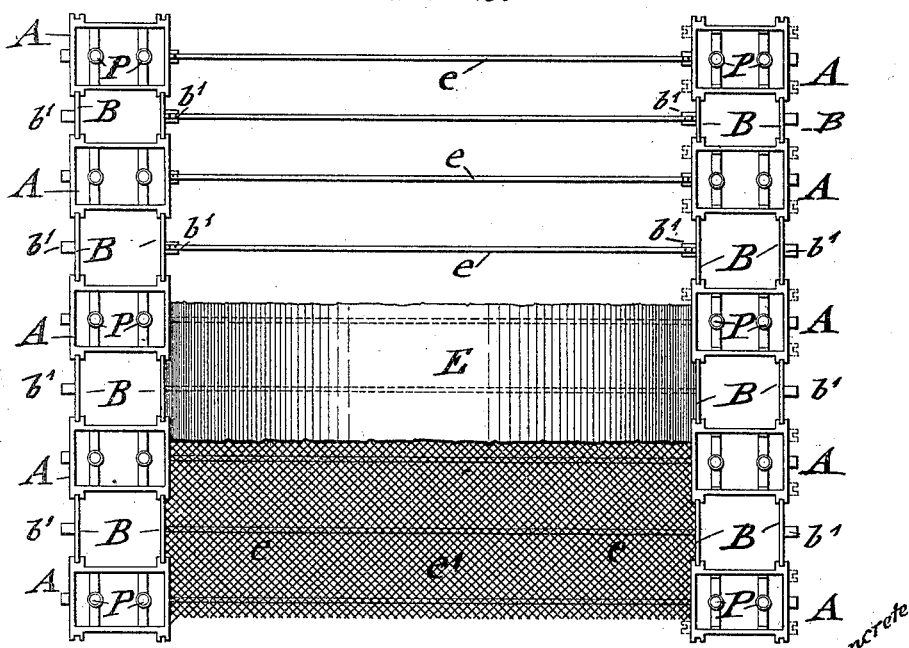
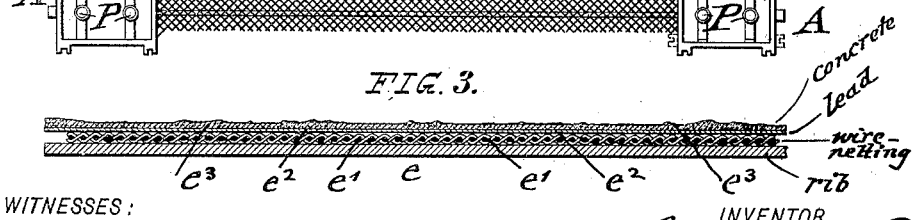
WITNESSES: INVENTOR
Bernhard H. Weisker
BY
ATTORNEYS
THE NORRIS PETERS CO., PHOTO-LITHO., WASHINGTON, D. C.

No. 699,729. Patented May 13, 1902.
B. H. WEISKER.
SYSTEM OF SUBMARINE CONSTRUCTION.
(Application filed Jan. 6, 1900. Renewed Oct. 7, 1901.)

(No Model.) 5 Sheets—Sheet 2.

WITNESSES:

INVENTOR
Bernhard H. Weisker
BY
ATTORNEYS

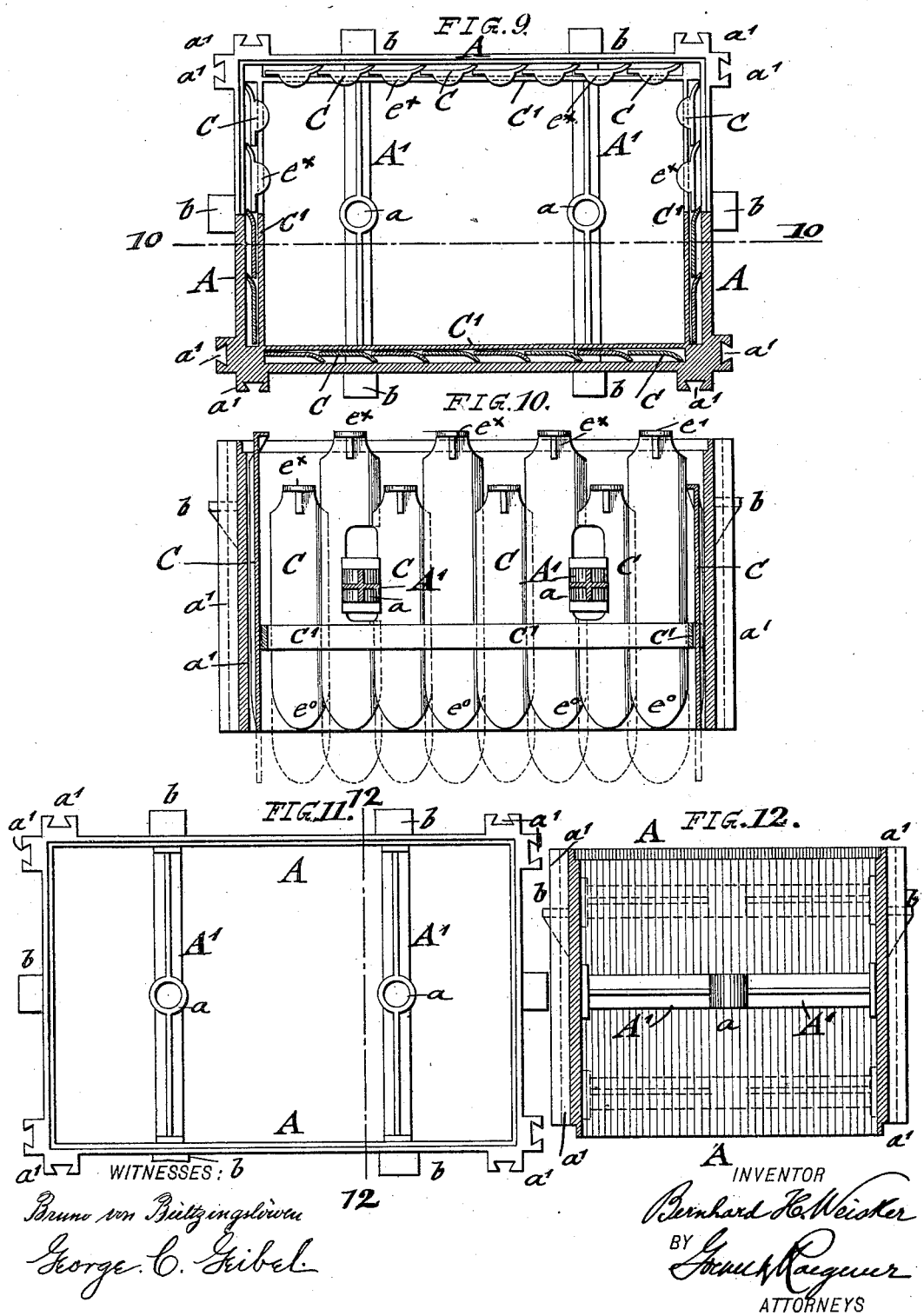

No. 699,729. Patented May 13, 1902.
B. H. WEISKER.
SYSTEM OF SUBMARINE CONSTRUCTION.
(Application filed Jan. 6, 1900. Renewed Oct. 7, 1901.)
(No Model.) 5 Sheets—Sheet 4.
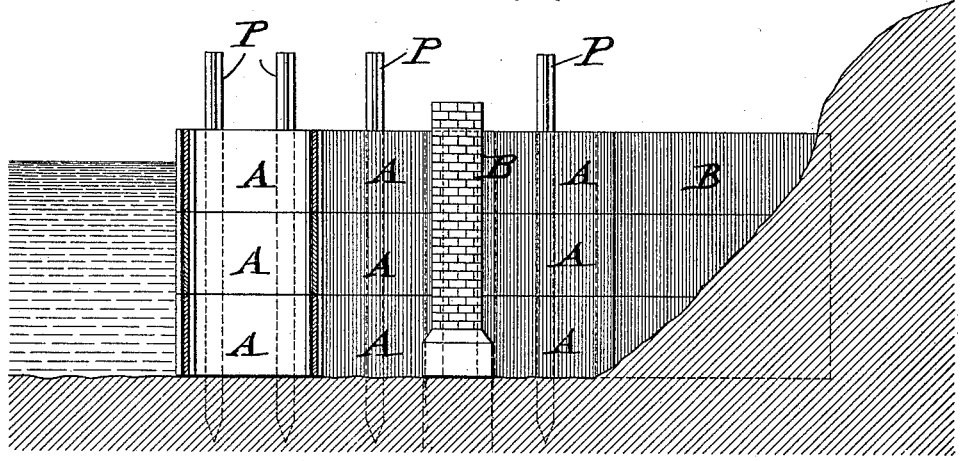
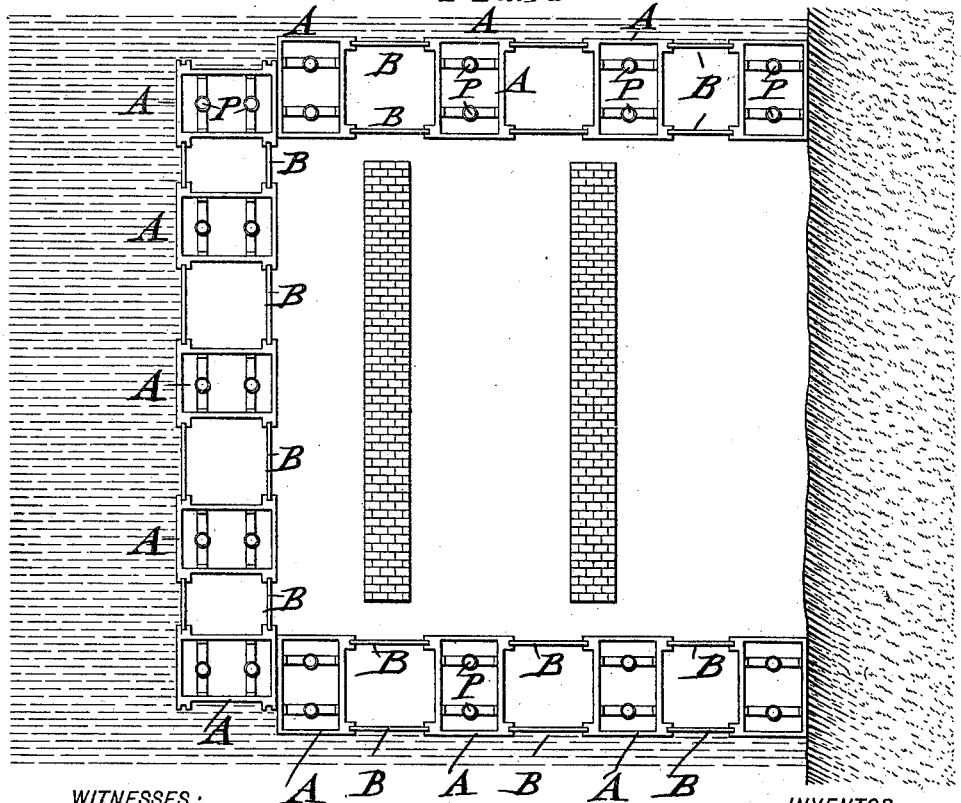

No. 699,729. Patented May 13, 1902.
B. H. WEISKER.
SYSTEM OF SUBMARINE CONSTRUCTION.
(Application filed Jan. 6, 1900. Renewed Oct. 7, 1901.)
(No Model.) 5 Sheets—Sheet 5.
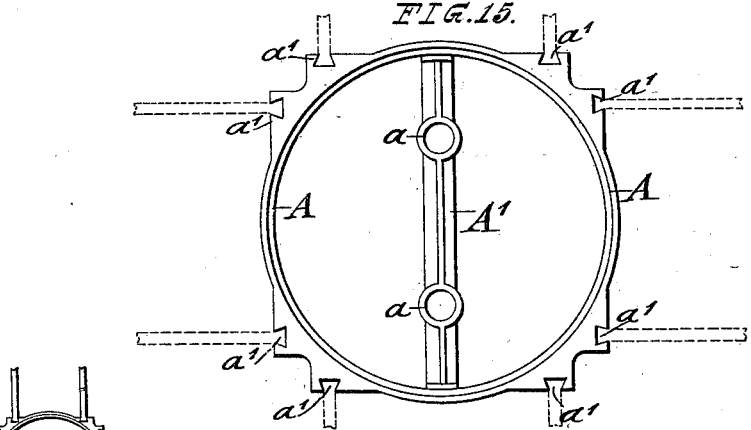
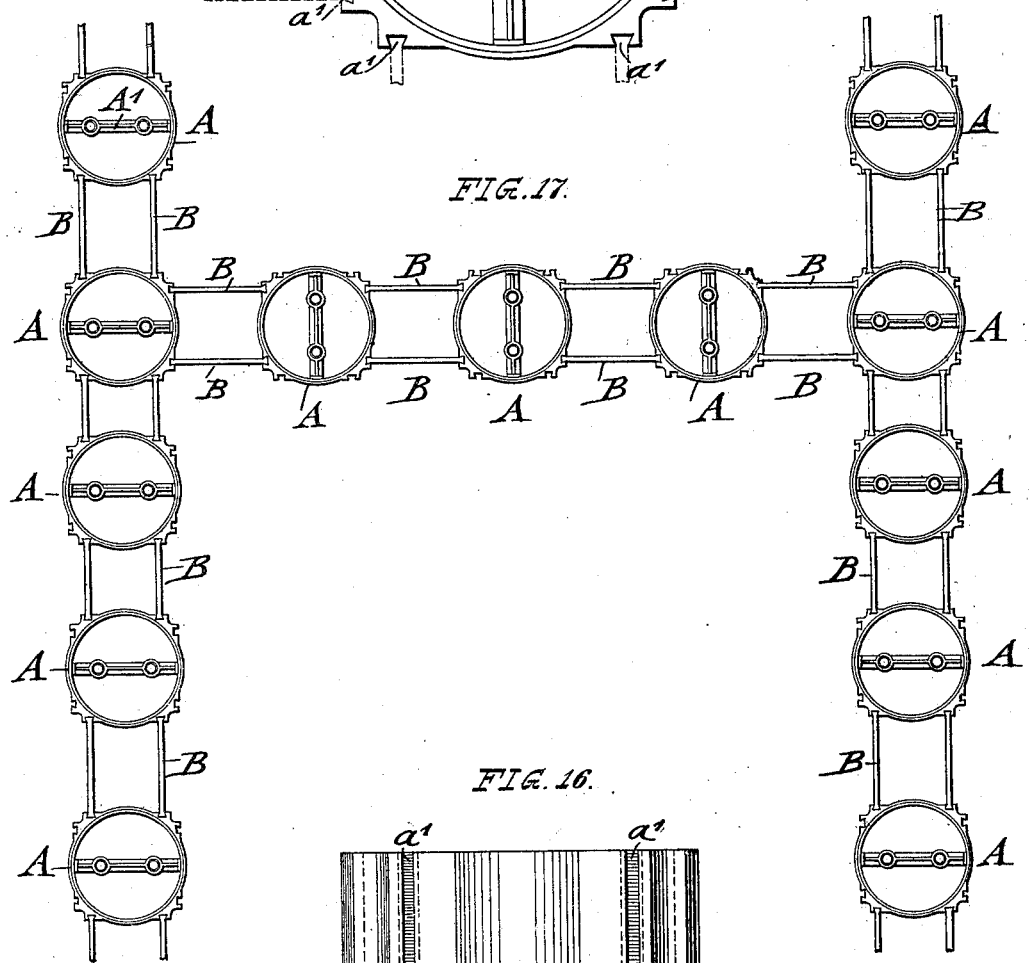
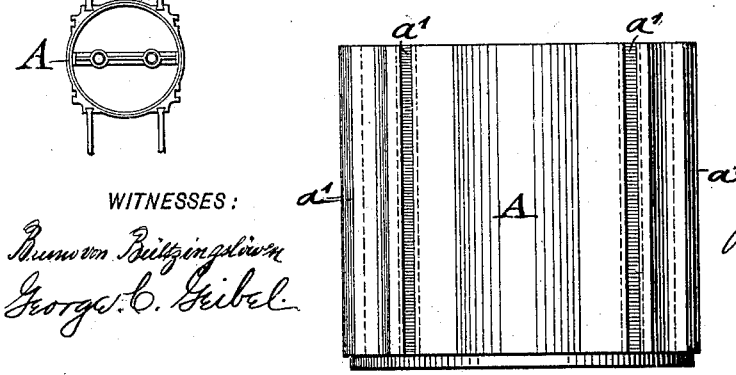
WITNESSES:
INVENTOR
Bernhard H. Weisker
BY
ATTORNEYS ary" id="7" />

UNITED STATES PATENT OFFICE.

BERNHARD H. WEISKER, OF NEW YORK, N. Y.

SYSTEM OF SUBMARINE CONSTRUCTION.

SPECIFICATION forming part of Letters Patent No. 699,729, dated May 13, 1902.

Application filed January 6, 1900. Renewed October 7, 1901. Serial No. 77,880. (No model.)

*To all whom it may concern:*

Be it known that I, BERNHARD H. WEISKER, a citizen of the United States, residing in the city of New York, in the borough of Bronx and State of New York, have invented certain new and useful Improvements in Systems of Submarine Construction, of which the following is a specification.

This invention relates to an improved system of submarine construction for building submarine tunnels, embankments, foundation of piers, and other engineering structures, and more especially to an improved coffer-dam by which these structures can be built in a quicker, cheaper, and more reliable manner than by the systems heretofore in use; and the invention consists in its general outlines of a coffer-dam composed of a number of independent coffer-dam sections of rectangular, circular, or other shape anchored to the bed of the river or other body of water by means of piles guided at the interior of said sections, anchoring shovels or blades guided in keepers of the lowermost coffer-dam sections, partitions connecting said sections, and anchored to the ground by similar shovels or blades, and a connecting-arch between said coffer-dam consisting of supporting-ribs and a water-tight covering layer extending over the ribs, said arch extending over the section of ground inclosed by the coffer-dam where the tunnel, wall, or foundation is to be built, so as to permit the removal of the body of water below said arch.

The invention consists, further, in the special construction of the individual coffer-dam sections, of the guide-piles for securing the same to the river or other bed, and of the covering-arch, as will be fully described hereinafter and finally pointed out in the claims.

Figure 4:
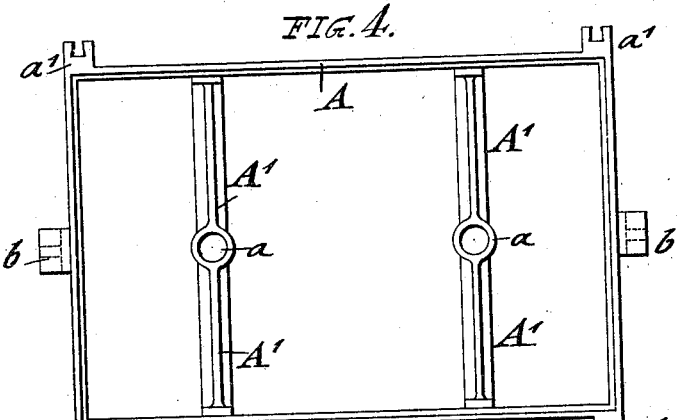
Figure 5:
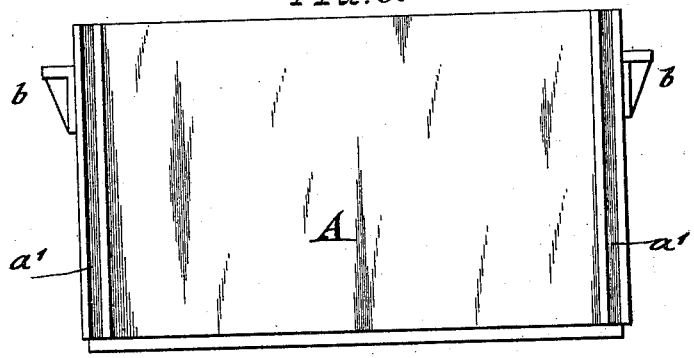
Figure 8:
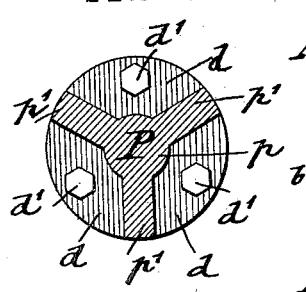
Figure 6:
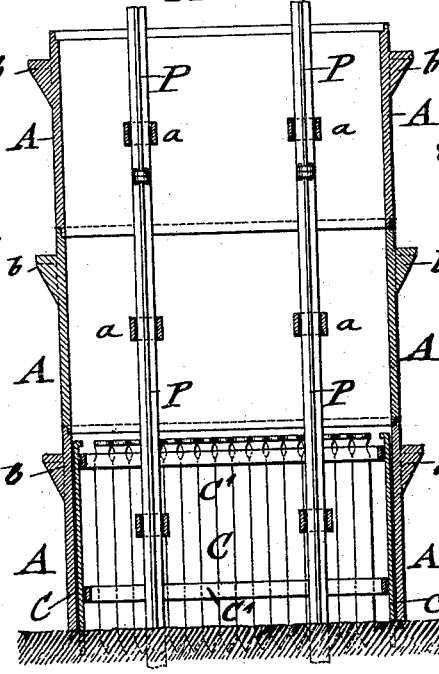
Figure 7:
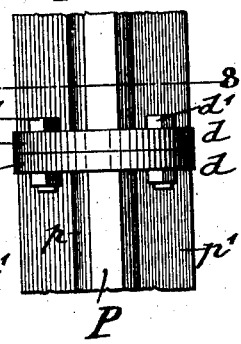

In the accompanying drawings, Figure 1 represents a vertical transverse section through a completed tunnel-section, showing my improved system of submarine construction shown as applied for building a tunnel. Fig. 2 is a plan view of Fig. 1 with the arch partly removed. Fig. 3 is a detail transverse section of the water-tight covering layer of the arch connecting the coffer-dam sections. Fig. 4 is a plan view of one of the coffer-dam sections drawn on a larger scale. Fig. 5 is a side elevation of the same. Fig. 6 shows a vertical section through a number of superposed coffer-dam sections secured to the bed of the watercourse by the guide-piles. Figs. 7 and 8 are respectively a side elevation and a horizontal section on line 8 8, Fig. 7, of one of the guide-piles employed for retaining the coffer-dam sections. Fig. 9 is a plan view, partly in horizontal section, of a modified coffer-dam section shown as secured to the bed by a series of vertically-guided anchoring shovels or blades. Fig. 10 is a vertical longitudinal section on line 10 10, Fig. 9. Figs. 11 and 12 are respectively a plan view and a vertical transverse section on line 12 12, Fig. 11, of a modified form of coffer-dam section. Fig. 13 is a vertical transverse section of my improved coffer-dam shown as applied for building the retaining-wall of an embankment. Fig. 14 is a plan of the coffer-dam shown as applied for building two walls of an embankment or similar engineering structures, said figure being drawn on a smaller scale than Fig. 13. Figs. 15 and 16 are respectively a plan view and a side elevation of a circular form of coffer-dam section, and Fig. 17 is a plan view of a coffer-dam formed of the circular sections shown in Figs. 15 and 16.

Similar letters of reference indicate corresponding parts.

In my improved system of building submarine structures—such as tunnels, embankments, foundations for bridge-piers, and the like—a coffer-dam is employed which is composed of a number of independent coffer-dam sections A, that are made of rectangular, circular, or other shape, as shown, respectively, in Figs. 4 and 15. The coffer-dam sections A are preferably made of boiler-iron of suitable strength and are provided with one or more transverse braces A', which are bolted or otherwise secured at their ends to the walls of the coffer-dam sections. The braces A' may be arranged either midway of the height of the section A or two may be arranged, one near the upper and the other near the lower end, as shown, respectively, in full and dotted lines in Fig. 12. The braces A' are provided with intermediate guide-sleeves $a$, by which the sections A can be readily lowered along guide-piles P, which are driven into the bed of the river or other watercourse in a line parallel or at right angles with the axis of the tunnel or other structure, the location of the piles being first accurately determined by proper surveys, so that the coffer-dam sections can be placed in position at the required distances from each other. When the guide-piles P of the required length are driven at the required distance from each other, the coffer-dam sections A are carried to the piles by means of scows or other vessels provided with suitable hoisting and lowering devices, every coffer-dam section being placed in position on two adjacent guide-piles and then slowly lowered along the same until it arrives on the bed of the river. When the depth of water is greater than the height of an individual coffer-dam section, it will be necessary to superpose one coffer-dam section upon the other, as shown in Figs. 1 and 6, and elongate the piles correspondingly, which is done by providing them with disks $d$ at their ends, as shown in Figs. 7 and 8, and connecting said disks by means of fastening-bolts $d'$. The guide-piles P are made of a central core $p$, having three radial wings $p'$, as shown in Fig.
8. The lower end of one coffer-dam section is shouldered and the upper end of the adjacent section recessed at its circumference, so that one section fits snugly into the section next below. When the several coffer-dam sections are superposed one above the other according to the relative depth of the water at the point where the tunnel or other structure is to be built, the lowermost sections are anchored to the bed of the river by means of anchoring shovels or blades C, which are guided along suitable keepers C', as shown in Figs. 9 and 10, and which are driven into the ground in the same manner as the piles P by suitable pile-driving devices on the scows.
After the coffer-dam sections are secured in position on the ground in two lines which are parallel with each other and the axis of the tunnel or other structure to be built they are connected by means of partition-walls B, which are made of boiler-iron, wood, or other suitable material and which are lowered in guideways $a'$, arranged at the outer corners of the rectangular coffer-dam sections, as shown in Figs. 4 and 5, or in pairs at each corner, as shown in Figs. 11 and 12, or in pairs at four equidistant points on the circular sections, as shown in Figs. 15 and 16. When the partitions B are placed in position so as to connect the individual coffer-dam sections, the partitions B, connecting the lowermost sections A, are likewise anchored to the ground by means of shovels or blades C, which are guided in keepers C' of the partitions in the same manner as the shovels employed for fastening the bottom sections A. The anchoring-shovels C are rounded off or pointed at the lower ends $e^0$ and provided with heads $e^\times$ at their upper ends, so as to facilitate the driving of the same by the rams of the pile-driving devices. The anchoring shovels or blades C are slightly curved along one side, so as to extend or lap over the side of the adjacent shovel or blade, and produce thereby the firm, tight, and reliable anchoring of the lowermost coffer-dam sections and partition-walls to the bed of the river or other watercourse. The coffer-dam sections are then filled with concrete at the bottom and above the same with clay or debris, so as to render them strong and water-tight.

The coffer-dam sections are provided at their outside with projecting brackets $b$, which are riveted, bolted, or otherwise attached to said section, either to opposite end walls or to the end and side walls of the same, as shown, respectively, in Figs. 4 and 12. The coffer-dam sections shown in Fig. 12 can be used for longitudinal and transverse connection, as called for by the special structure to be built. The partition-walls B are likewise provided with brackets $b'$, as shown in Fig. 12. These brackets serve for the purpose of supporting an arch E, that extends transversely from one line of coffer-dam sections to the other and which is composed of a number of arched ribs $e$, of wrought-iron, over which a strong wire-netting $e'$ is placed, which is again covered by thin sheets of lead $e^2$, as shown in Fig. 3. Over the layer of lead may be placed a layer $e^3$ of concrete, asphaltum, or other water-tight material. The strength of the ribs and the superposed layers has to be in proportion to the pressure induced by the height of the column of water above the arch. The ribs and different layers described form a strong and absolutely water-tight arch between the two parallel lines of coffer-dam sections, as shown in Figs. 1 and 2. The ribs, wire-netting, and lead sheets are placed in position by divers, while the covering layer of concrete or asphaltum is laid over the netting by means of chutes, which extend down from the scows to the arch and through which the covering material, which is mixed in the scows, is run down on the arch. When the tunnel is built at some depth below the river-bed, the wire-netting and thin sheets of lead are placed in the coffer-dam directly on the bed of the river and afford then sufficient protection for the tunnel; but when the tunnel is to be built partly below the river-bed and partly above the same the arch has to be at a suitable distance above the same, as shown in full lines in Fig. 1, while when the tunnel is to be built entirely above the river-bed the arch has to be arranged at greater height above the bed, as shown in dotted lines in Fig. 1.

After the parallel lines of coffer-dam sections and partitions are placed in position they are connected by transverse lines of coffer-dam sections and partitions, the water-tight transverse arch being then constructed between them in the manner described, so that the body of water in the space inclosed by the coffer-dam sections, the arch, and the river-bed can be removed either by pumping when near the shore or later by draining it off simply by gravity through the completed sections of the tunnel. The transverse portions of the coffer-dam are necessary when the building of the tunnel progresses away from the shore into a greater depth of water. The tunnel-section is then built in the usual manner by excavating the earth to the proper depth within the coffer-dam and completing the bottom, side, and top walls, each tunnel-section being equal with the clear interior length of the coffer-dam. When the tunnel-section is finished, the coffer-dam sections are taken up again, together with the arch, and placed again in position on the river-bed in the direction of the tunnel, so as to permit the building of the next tunnel-section; and so on until the tunnel is built across the river or other watercourse. As the depth of water increases the number of superposed coffer-dam sections is likewise increased, so that a coffer-dam of the required strength for supporting the temporary arch is obtained. When the structure to be built is at or near the shore, a coffer-dam of U shape is used, as shown in Figs. 13 and 14. In this case the arch may be dispensed with and the structure built, after pumping out the water inclosed by the coffer-dam, in the same manner as the coffer-dams heretofore in use. It is obvious that the strength of the coffer-dam, as well as the strength of the arch, has to be computed, so that they can resist the greatest pressure that can possibly be exerted on them either by the side pressure on the coffer-dam or by the downward pressure of the column of water above the arch.

For most purposes the coffer-dam sections are only provided with one set of guideways at each corner, as shown in Figs 2, 4, and 14. For some purposes, however, it may be advisable to arrange them with two sets of guideways at each corner—that is to say, two sets on each side of the coffer-dam section, as shown in Figs. 9 to 12. The guideways are preferably of dovetail shape in cross-section, the ends of the partition-walls being made of corresponding shape, so as to interlock therewith. In the circular coffer-dam sections the guideways are made of cast-metal blocks, which are attached to the outside of the sections and provided with two guideways each, as shown in Figs. 15, 16, and 17.

My improved system for building submarine structures has the advantage that the boring of the tunnel at a certain depth below the bottom of the bed of the river or other watercourse is dispensed with and that the tunnel can be built either directly below or partly above and partly below or entirely above the bed of the river or other watercourse and that the work can be carried on in sections, if desired, from opposite ends or even from one or more intermediate points in opposite directions toward each other, so that a long tunnel can be finished in a much quicker time than by the systems heretofore known. Another advantage is that the coffer-dam can be used over and over again, the coffer-dam sections, piles, partitions, &c., being laid up ashore during the winter season and used again whenever the favorable season arrives. A further advantage is that the coffer-dam can be used for all engineering works along the shore or in the water without being specially confined to tunnels and that the work is carried on in all cases, whether near the shore or in a considerable depth of water, after the coffer-dam is placed in position, in the same manner as when building large-sized sewers on land, and at a greatly-reduced cost as compared with the systems of building submarine tunnels or other structures heretofore known.

Having thus described my invention, I claim as new and desire to secure by Letters Patent—

1. A coffer-dam, consisting of separate coffer-dam sections of rectangular, circular or other shape, said sections being provided with exterior guideways, piles for guiding said sections and holding them in position, and partition-walls guided in said ways for connecting said coffer-dam sections, substantially as set forth.

2. A coffer-dam, consisting of a number of separate coffer-dam sections of rectangular, circular or other shape, braces connecting the walls of said sections, guide-sleeves in said braces, piles in said sleeves for guiding the sections into position, and partition-walls connecting the opposite ends of said coffer-dam sections, substantially as set forth.

3. A coffer-dam, consisting of a number of independent coffer-dam sections of rectangular, circular or other shape, transverse stiffening-braces in said sections, guide-sleeves in said braces, piles in said guide-sleeves for guiding and retaining the sections in position, partition-walls connecting said coffer-dam sections, and a series of vertically-guided anchoring shovels or blades arranged on the walls of the coffer-dam sections and partitions, substantially as set forth.

4. The combination, with a coffer-dam composed of a number of separate coffer-dam sections of rectangular, circular or other shape, of piles for holding said sections in position, partition-walls connecting said coffer-dam sections, anchoring shovels or blades for securing the lowermost coffer-dam sections and partitions on the ground, and a water-tight arch connecting the coffer-dam sections and partition-walls, substantially as set forth.

5. A coffer-dam section composed of an open casing of rectangular, circular or other shape provided with transverse braces having interior guide-sleeves, substantially as set forth.

6. A coffer-dam section composed of an open casing of rectangular, circular or other shape provided with transverse braces having interior guide-sleeves and exterior guideways near the corners, substantially as set forth.

7. A coffer-dam section composed of an open casing of rectangular, circular or other shape, provided with transverse braces having interior guide-sleeves, exterior guideways near the corners, and exterior projecting brackets on the walls, substantially as set forth.

8. The combination, with a coffer-dam, consisting of a number of coffer-dam sections secured by piles, of partition-walls between said sections, said sections and partition-walls being provided with projecting brackets, and a transverse water-tight arch connecting said coffer-dam sections and partitions and composed of arched supporting-ribs resting on said brackets, wire-netting placed on said ribs, and a layer of waterproof material placed over said netting, substantially as set forth.

9. In a system of submarine construction, a temporary arch extending across the coffer-dam and composed of arched supporting-ribs, wire-netting placed on said ribs and a layer of waterproof material placed over said netting, substantially as set forth.

10. In a system of submarine construction, a temporary arch spanning the coffer-dam and composed of arched supporting-ribs, wire-netting placed on said ribs, a layer of thin sheet-lead placed over said wire-netting and a layer of waterproof material placed in the layer of sheet-lead, substantially as set forth.

11. In a system of submarine construction, a temporary guard-covering, consisting of wire-netting, sheets of lead spread over said netting, and a layer of waterproof material placed over said sheets of lead, substantially as set forth.

In testimony that I claim the foregoing as my invention I have signed my name in presence of two subscribing witnesses.

BERNHARD H. WEISKER.

Witnesses:
PAUL GOEPEL,
M. H. WURTZEL.